US008041058B2

(12) United States Patent
Kentish et al.

(10) Patent No.: US 8,041,058 B2
(45) Date of Patent: Oct. 18, 2011

(54) AUDIO PROCESSING WITH TIME ADVANCED INSERTED PAYLOAD SIGNAL

(75) Inventors: William Edmund Cranstoun Kentish, Chipping Norton (GB); Nicolas John Haynes, Enstone (GB)

(73) Assignee: Sony Europe Limited, Weybridge (GB)

( * ) Notice: Subject to any disclaimer, the term of this patent is extended or adjusted under 35 U.S.C. 154(b) by 1418 days.

(21) Appl. No.: 11/529,342

(22) Filed: Sep. 29, 2006

(65) Prior Publication Data

US 2007/0100483 A1 May 3, 2007

(30) Foreign Application Priority Data

Oct. 28, 2005 (GB) .................................. 0522051.2

(51) Int. Cl.
*H04B 1/00* (2006.01)
*H04B 3/00* (2006.01)
*G06F 17/00* (2006.01)

(52) U.S. Cl. ............................ 381/119; 381/77; 700/94

(58) Field of Classification Search .................... 700/94; 381/119, 77; 340/5.8; 726/32; 713/176
See application file for complete search history.

(56) References Cited

U.S. PATENT DOCUMENTS

| | | | | |
|---|---|---|---|---|
| 5,768,426 | A | 6/1998 | Rhoads | |
| 5,940,429 | A * | 8/1999 | Lam et al. | 375/130 |
| 6,061,793 | A | 5/2000 | Tewfik et al. | |
| 2005/0043830 | A1 * | 2/2005 | Lee et al. | 700/94 |

FOREIGN PATENT DOCUMENTS

EP 1 324 262 A2 7/2003

OTHER PUBLICATIONS

Benito Carnero, et al., "Perceptual Speech Coding and Enhancement Using Frame-Synchronized Fast Wavelet Packet Transform Algorithms", IEEE Transactions on Signal Processing, XP 011058574, vol. 47, No. 6, Jun. 1999, pp. 1622-1635.
M. D. Swanson. et al., "Robust Audio Watermarking Using Perceptual Masking", Signal Processing, XP 004124956, vol. 66, No. 3, May 28, 1998, pp. 337-355.
Teddy Surya Gunawan, et al., "Single Channel Speech Enhancement Using Temporal Masking", Communication Systems, XP 010743321, Sep. 6, 2004, pp. 250-253.
Paraskevi Bassia, et al., "Robust Audio Watermarking in the Time Domain", IEEE Transactions on Multimedia, XP 011036241, vol. 3, No. 2, Jun. 2001, pp. 232-241.

* cited by examiner

*Primary Examiner* — Vivian Chin
*Assistant Examiner* — Douglas Suthers
(74) *Attorney, Agent, or Firm* — Oblon, Spivak, McClelland, Maier & Neustadt, L.L.P.

(57) ABSTRACT

Audio processing apparatus in which a payload signal is inserted into a primary audio signal comprises a noise generator operable to generate a noise signal in dependence on the payload signal; a level detector for detecting a signal level of the primary signal; a modulator for respectively increasing or decreasing the level of the noise signal in response to an increase or a decrease of the detected signal level of the primary audio signal, to generate a modulated noise signal; a combiner for combining the primary signal and the modulated noise signal; and a signal delay arrangement; the modulator operating with respect to the signal delay arrangement so that a decrease in the level of the noise signal is time-advanced with respect to the corresponding decrease in the signal level of the primary audio signal.

14 Claims, 14 Drawing Sheets

AUDIO PROCESSING WITH TIME ADVANCED INSERTED PAYLOAD SIGNAL

BACKGROUND OF THE INVENTION

1. Field of the Invention

This invention relates to audio processing.

2. Description of the Prior Art

In applications such as digital fingerprinting or watermarking (which may collectively be referred to by the term forensic marking), a payload signal may be inserted into a primary audio signal in the form of a noise pattern such as a pseudo-random noise signal. The aim is generally that the noise signal is near to imperceptible and, if it can be heard, is not subjectively disturbing. This type of technique allows various types of payload to be added in a way which need not alter the overall bandwidth, bitrate and format of the primary audio signal. The payload data can be recovered later by a correlation technique, which often still works even if the watermarked audio signal has been manipulated or damaged in various ways between watermark application and watermark recovery.

Examples of the type of payload data which can be added include security data (e.g. for identifying pirate or illegal copies), broadcast monitoring data and metadata describing the audio signal represented by the primary audio signal.

The noise signal can be modulated before being added to the primary audio signal. This means in general terms that the level of the noise signal is increased when the level of the primary audio signal increases, and is decreased when the level of the primary audio signal decreases. In this way, more of the payload data's noise signal (giving a potentially better recovery of the payload data) can be included when it can be masked by louder passages in the primary audio signal.

However, if the noise signal tracks the primary audio signal too closely it can become audible and potentially subjectively disturbing, especially with sounds such as drum beats and the like.

In envelope-controlled audio processing systems a time constant can be applied to the rise time and fall time of the controlled signal (in this example, the noise signal). These are known as the attack and decay (or release) time constants. If such measures are applied to the present example, the result is that a rapid rise in the primary audio signal level causes a slower rise in the noise signal. This is quite acceptable—even desirable in some circumstances. But it is more of a problem that a sudden decrease in the primary audio signal level would lead to a slower decrease in the noise signal level. In an extreme case this could lead to undesirable situation of the noise signal being instantaneously larger than the primary audio signal.

SUMMARY OF THE INVENTION

This invention provides audio processing apparatus in which a payload signal is inserted into a primary audio signal, the apparatus comprising:

a noise generator operable to generate a noise signal in dependence on the payload signal;

a level detector for detecting a signal level of the primary signal;

a modulator for respectively increasing or decreasing the level of the noise signal in response to an increase or a decrease of the detected signal level of the primary audio signal, to generate a modulated noise signal;

a combiner for combining the primary signal and the modulated noise signal; and a signal delay arrangement;

the modulator operating with respect to the signal delay arrangement so that a decrease in the level of the noise signal is time-advanced with respect to the corresponding decrease in the signal level of the primary audio signal.

The invention addresses the problem described above by providing a time-advanced release function, so that a decrease in the level of the noise signal is time-advanced with respect to the corresponding decrease in the signal level of the primary audio signal. In other words, with respect to the primary audio signal, the noise signal starts to fall before the primary audio signal starts to fall. The amount of this time advance can be set, relative to any release time constant in the system and the audio bandwidth of the primary audio signal, so that either the noise signal is never larger than the primary audio signal, or so that any difference between them is within limits considered to be acceptable.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Introduction

Figure 1:
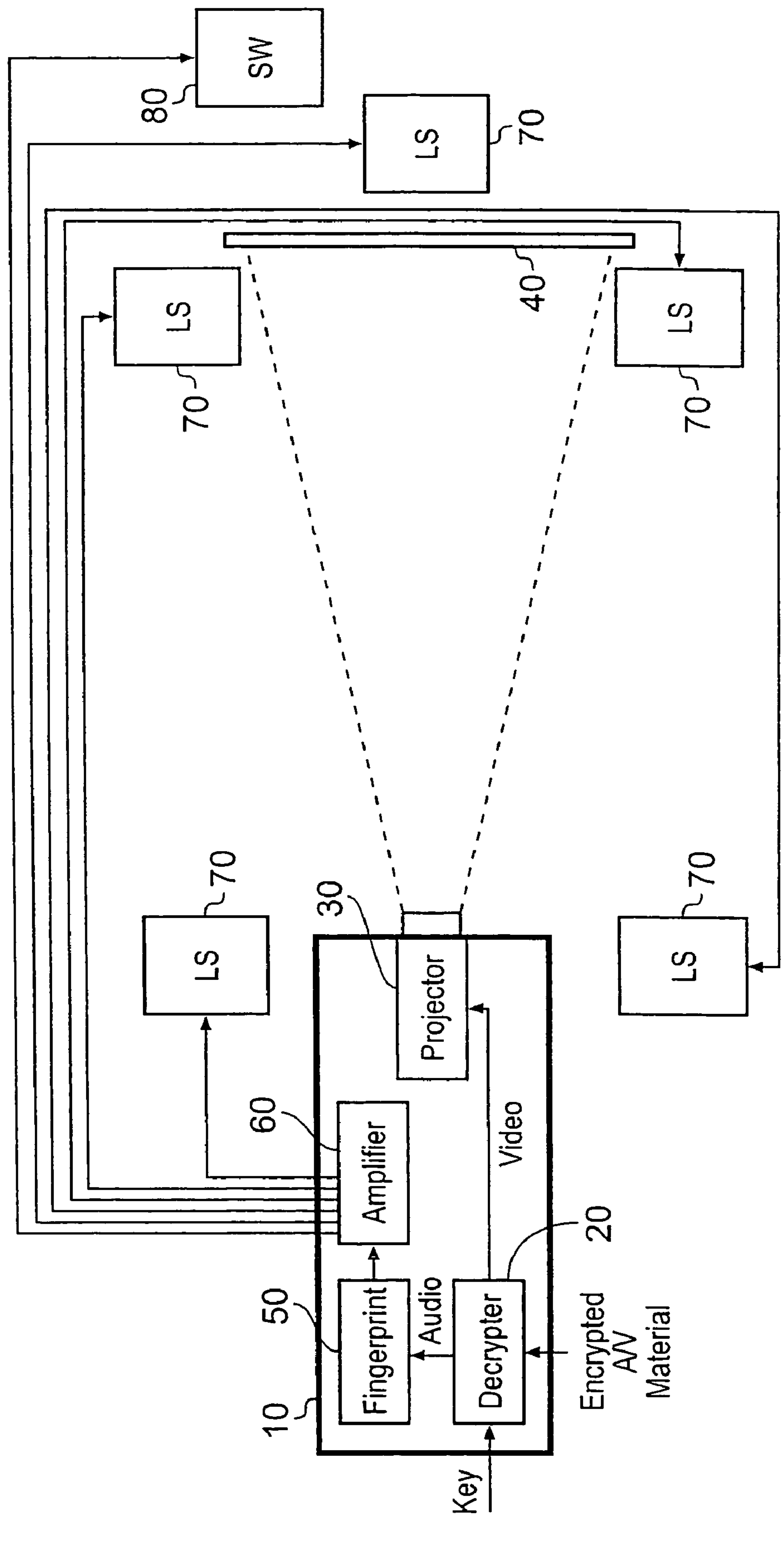
FIG. 1 schematically illustrates a digital cinema arrangement including a fingerprint encoder.

Fingerprinting or watermarking techniques—more generically referred to as forensic marking techniques—have been proposed which are suitable for video signals. See for example EP-A-1 324 262. While the general mathematical framework may appear in principle to be applicable to audio signals, several significant technical differences are present. In the present description, both "fingerprint" and "watermark" will be used to denote a forensic marking of material.

One of the main factors to be considered is how the fingerprint data should be encoded into the audio signal. The human ear is very different from the human eye in terms of sensitivity and dynamic range, and this has made many previous commercial fingerprinting schemes fail in subjective listening ("A/B") tests.

The human ear is capable of hearing phase differences of less than one sample at a 48 kHz sampling rate, and it has a working dynamic range of 9 orders of magnitude at any one time. With this in mind, an appropriate encoding method is considered to be encoding the fingerprint data as a low-level noise signal that is simply added to the media.

Noise has many psycho-acoustic properties that make it favourable to this task, not least of which is that the ear tends to ignore it when it is at low levels, and it is a sound that is generally calming (in imitation of the natural sounds of wind, rushing streams or ocean waves), rather than generally irritating. The random nature of noise streams also implies there is little possibility of interfering with brain function in the way that, for example, strobe effects or malicious use of subliminal information can do to visual perception.

An implementation of this type of technique will now be described.

Mathematical Foundation

Consider a fingerprint payload "vector" (e.g. stream of values) P=p[1] . . . p[n].

For the embedding process, this payload is added to an audio signal vector (e.g. stream of samples) V=v[1] . . . v[n] to yield a watermarked payload vector W=V+P.

The elements of the payload vector P are statistically independent random variables of mean value 0, and standard deviation $\alpha^2$, where $\alpha$ is referred to as the strength of the watermark, written as $N(0, \alpha^2)$. Simply stated, this notation is used to indicate that the payload is a Gaussian random noise stream. The noise stream is scaled so that the standard deviation is in the range +/−1.0 as an audio signal. This scaling is important because if this is not done correctly, the similarity indicator ("SimVal") calculated below will not be correct. Note that the convention here is that +/−1.0 is considered to be "full scale" in the audio domain, and so in the present case many samples of the Gaussian noise stream will actually be greater than full scale.

For the extraction process, the original proxy vector V is subtracted from a watermarked suspect vector (e.g. a pirate copy of the audio material in question) Ws to yield the suspect payload vector Ps=Ws−V. In other words, Ps=Suspect-audio-stream−Proxy-audio-stream.

To test whether the content was watermarked with a candidate payload vector P, an inner-loop correlation (written as "·") is performed between the candidate payload vector P and the normalised suspect payload vector Ps to yield a similarity value, hereafter termed a SimVal:

$$\text{SimVal}=(Ps/|Ps|)\cdot P$$

where |Ps| is the vector magnitude of Ps, meaning |Ps|=sqrt (Ps·Ps). Here, sqrt indicates a square root function. Note that to normalise a vector means to scale the values within the vector so they add up to a magnitude of exactly 1.

This formula indicates the degree of statistical correlation between Ps and P, with a maximum value that is close to the square root of the length of the vector. We say that if the SimVal is greater than a particular threshold value T, then the payload P is present in Ps, and if the SimVal<=T, then it is not present.

In order to give the values of SimVal some statistical meaning, the value of T is related to the probability of a false positive by the following formula:

$$T=\text{sqrt}(2\ \ln\ (M^2/p\ \text{sqrt}(2\ \pi)))$$

where p is the false positive probability, ln is the natural logarithm, and M is the population size (i.e. the number of unique payload vectors issued for the given audio content). For example, if the false probability is required to be better than 1 in 100,000,000, and the population size is 1000, the value SimVal will need to be greater than 8.

Generally speaking, a SimVal of 10 is a useful aim in forensic analysis of pirate audio material using the present techniques. For particularly large populations M, a value of 12 might be more appropriate. In empirical trials, it has been found that if a value of 8 is reached within analysis of a few seconds of the suspect audio material, a value of 12 will generally be reached within another few seconds.

FIG. 1 schematically illustrates a digital cinema arrangement in which a secure playout apparatus 10 receives encrypted audio/video material along with a decryption key. A decrypter 20 decrypts the audio and video material. The decrypted video material is supplied to a projector 30 for projection onto a screen 40. The decrypted audio material is provided to a fingerprint encoder 50 which applies a fingerprint as described above.

Generally, the fingerprint might be unique to that material, that cinema and that instance of replay. This would allow piracy to be retraced to a particular showing of a film.

The fingerprinted audio signal is passed to an amplifier 60 which drives multiple loudspeakers 70 and sub-woofer(s) 80 in a known cinema sound configuration.

Fingerprinting may also be applied to the video information. Known video fingerprinting means (not shown) may be used.

Preferably, the playout apparatus is secure, in that it is a sealed unit with no external connections by which non-fingerprinted audio (or indeed, video) can be obtained. Of course, the amplifier 60 and projector 30 need not necessarily form part of the secure system.

If an illegal copy is made of the material from that cinema performance, for example by the use of a camcorder within the cinema, the audio content associated with the film will have the fingerprint information encoded by the fingerprint encoder 50 included within it. In order to establish this, for investigative or legal reasons, a suspect copy of the material can be supplied to a fingerprint detector 80 of FIG. 2 along with the original (or "proxy") material and a key used to generate the original fingerprint. In its simplest terms, the fingerprint detector 80 generates a probability that the particular fingerprint is present in the suspect material. The detection process will be described in more detail below.

Embedding Process

In video fingerprinting the techniques are generally frame based (a frame being a natural processing block size in the video domain), and the whole of the fingerprint payload vector is buried (at low level) in each frame. In some systems the strength of the fingerprint is set to be greater in "busier" image areas of the frame, and also at lower spatial frequencies which are difficult or impossible to remove without seriously changing the nature of the video content. The idea is that over many frames the correlations on each frame can be accumulated, as if the correlation were being done on a single vector; if there is a real statistical correlation between the suspect payload Ps and the candidate payload P, the correlation will continue to rise from frame to frame.

For audio, there is generally no such natural processing block.

In the present embodiments, for reasons of efficiency of fast Fourier transform (FFT) operations, a processing block size of the audio version is set to a power of 2 audio samples, for example 64k samples (65536 samples). Note also that the vector lengths will be the same size as the processing block.

Successive correlations for these audio frames can be accumulated in the same way as for the video system.

There is one sample of payload vector for each sample of content. Also, the payload is concentrated in the "mid-frequencies" because both the high frequency content (say >5 KHz) and the low frequency content (say <150 Hz) can be completely lost without intolerable loss of audio quality. The loss of these frequencies could be an artefact of poor recording equipment or techniques on the part of a pirate, or they could be deliberately removed by a pirate to try to inhibit a fingerprint recovery process. It is therefore more appropriate to concentrate the payload into the more subjectively important mid frequencies, i.e. frequencies that cannot be easily removed without seriously degrading the quality.

In general terms:

1. The payload seeds an AES Rijndael-based pseudo-random number stream to generate a noise stream.
2. The noise stream is "shaped" according to a perceptual analysis of the audio stream.
3. The shaped noise stream is added at low level to the audio stream.

The generated noise stream contains multiple layers within it, each generated from a different subset of the payload data. It will be appreciated that other data could be included within the payload, such as a frame number and/or the date/time.

The random number streams are generated by repeated application of 256-bit Rijndael encryption to a moving counter. The numbers are then scaled to be within +/−1.0, to produce full scale white noise. The white noise stream is turned into Gaussian noise by applying the Box-Muller transform to pairs of points.

In the present embodiment there are 16 layers to the noise stream. A first layer of the pseudo-random noise generator is seeded by the first 16 bits of the payload, the second layer seeded by the first 32 bits of the payload, and so on until the $16^{th}$ layer which is seeded by the entire 256 bit payload.

Perceptual analysis involves a simple spectral analysis in order to establish a gain value to scale the Fingerprint noise stream for each sample in the audio stream. The idea is that louder sections in the audio stream will hide louder intensity of fingerprint noise.

Extending this concept further, the mid-frequency content of the audio stream (where the fingerprint is to be hidden) is split into several bands (say 8 or 12) which are preferably spread evenly on a logarithmic frequency scale (though of course any band-division could be used). This means, for example, that the frequency spectrum is roughly divided into the octaves. Each band is then processed separately to generate a respective gain envelope that is used to modulate the amplitude of the corresponding frequency band in the fingerprint noise stream. When the envelope modulation is used in all bands, the result is that the noise stream sounds very much like a "ghostly" rendition of the original audio signal. More importantly, this ghostly rendition, because of its similarity to the content, when added to the original material, becomes inaudible to the ear, despite being added at relatively high signal levels. For example, even if the modulated noise is added at a level as high as −30 dB (decibels) relative to the audio, it can subjectively be almost inaudible.

The present embodiment uses 2049 sample impulse response kernels to implement "brick wall" (steep-sided response) convolution band filters to separate the information in each frequency band. The convolutions are done in the FFT domain for speed. One important reason for using convolution filters for the band pass filter rather than recursive filters is that the convolution filters can be made to have a fixed delay that is independent of frequency. The reason this is important is that the modulations of the noise-stream for any given frequency band must be made to line up with the actual envelope of the original content when the noise stream is added. If the filters were to have a delay that depends on frequency, the resultant misalignment would be difficult to correct, which could lead to increased perceptibility of the noise and possible variation of correlation values with frequency.

Figure 3:
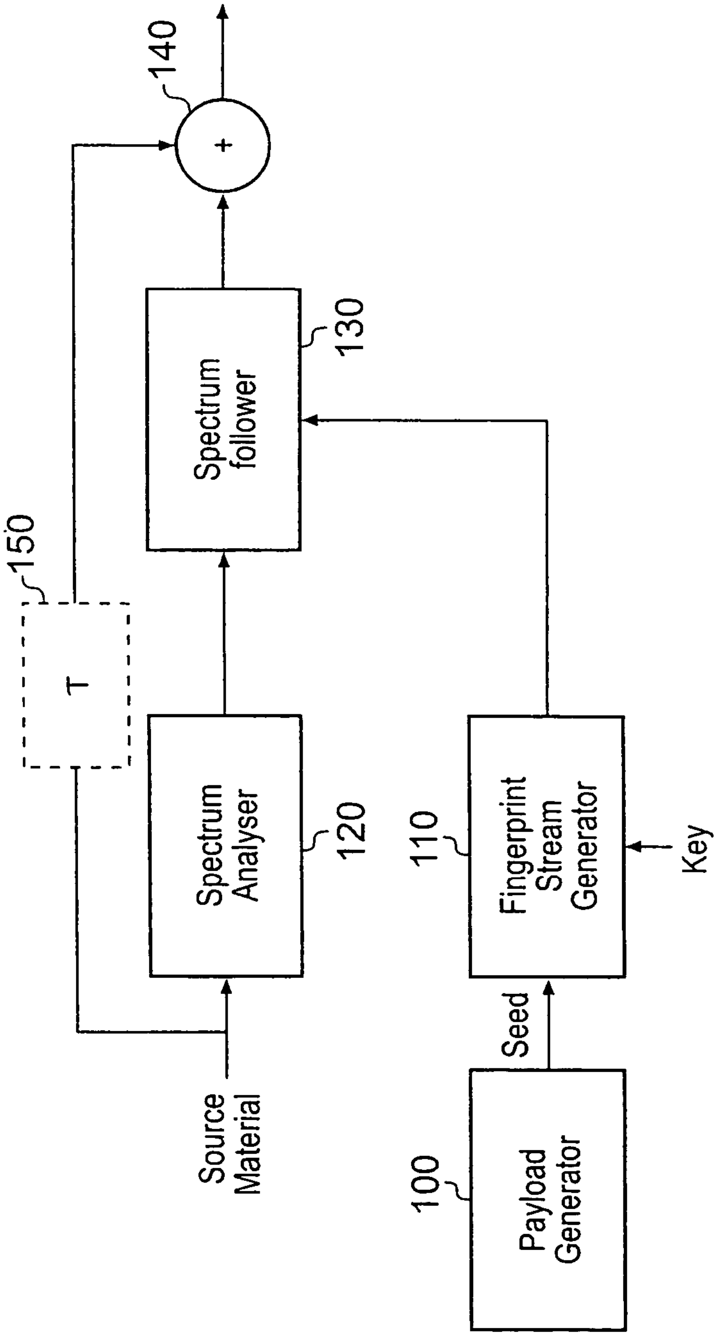
FIG. 3 is a schematic overview of the operation of a fingerprint encoder.

FIG. 3 is a schematic overview of the operation of a fingerprint encoder such as the encoder 50 of FIG. 1. A payload generator 100 produces payload data to be encoded as a fingerprint. As mentioned above, this could include various content and other identifiers and may well be unique to that instance of the replay of the content. The payload generator will be described further below with reference to FIG. 4.

The payload is supplied to a fingerprint stream generator 110. As described above, this is fundamentally a random number generator using AES-Rijndael encryption based on an encryption key to produce an output sequence which depends on the payload supplied from the payload generator 100. The fingerprint stream generator will be described further below with reference to FIG. 5.

The source material (to which the fingerprint is to be applied) is supplied to a spectrum analyser 120. This analyses the amplitude or envelope of the source material in one or more frequency bands. The spectrum analyser supplies envelope information to a spectrum follower 130. The spectrum follower modulates the noise signal output by the fingerprint stream generator 110 in accordance with the envelope information from the spectrum analyser 120. The spectrum analyser will be described further below with reference to FIG. 6 and the spectrum follower with reference to FIG. 7.

The output of the spectrum follower 130 is a noise signal at a significantly lower level than the source material but which generally follows the envelope of the source material. The noise signal is added to the source material by an adder 140. The output of the adder 140 is therefore a fingerprinted audio signal.

A delay element 150 is shown schematically in the source material path. This is to indicate that the spectrum analysis and envelope determination may take place on a time-advanced version of the source material compared to that version which is passed to the adder 140. This time-advance feature will be described further below.

Figure 4:
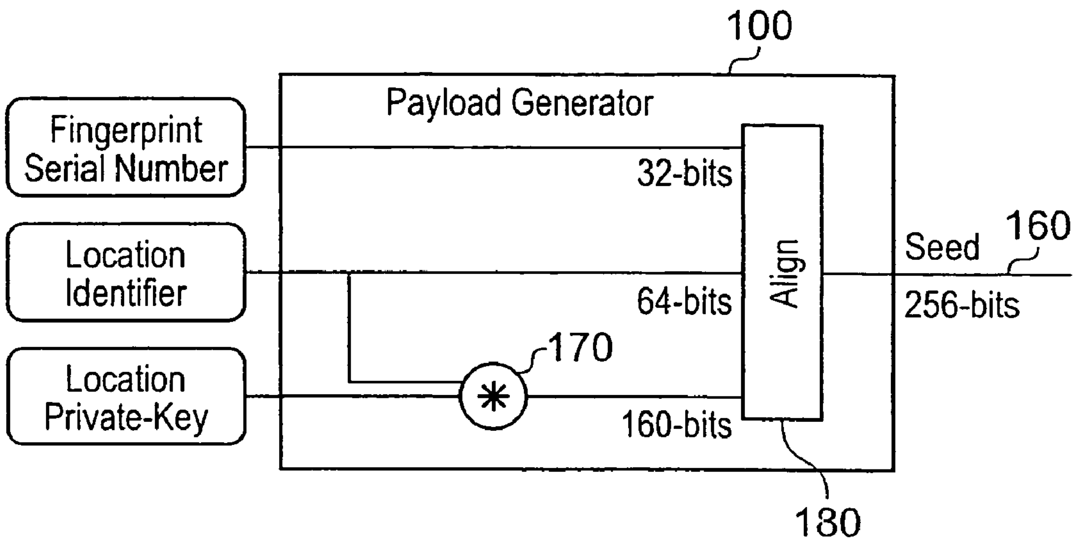
FIG. 4 schematically illustrates a payload generator.

FIG. 4 schematically illustrates a payload generator. As mentioned above, this takes various identification data such as a serial number, a location identifier and a location private key and generates payload data 160 which is supplied as a seed to the fingerprint stream generator 110. The location private key may be used to encrypt the location identifier by an encryption device 170. The various components of the payload data are bit-aligned for output as the seed by logic 180.

Figure 5:
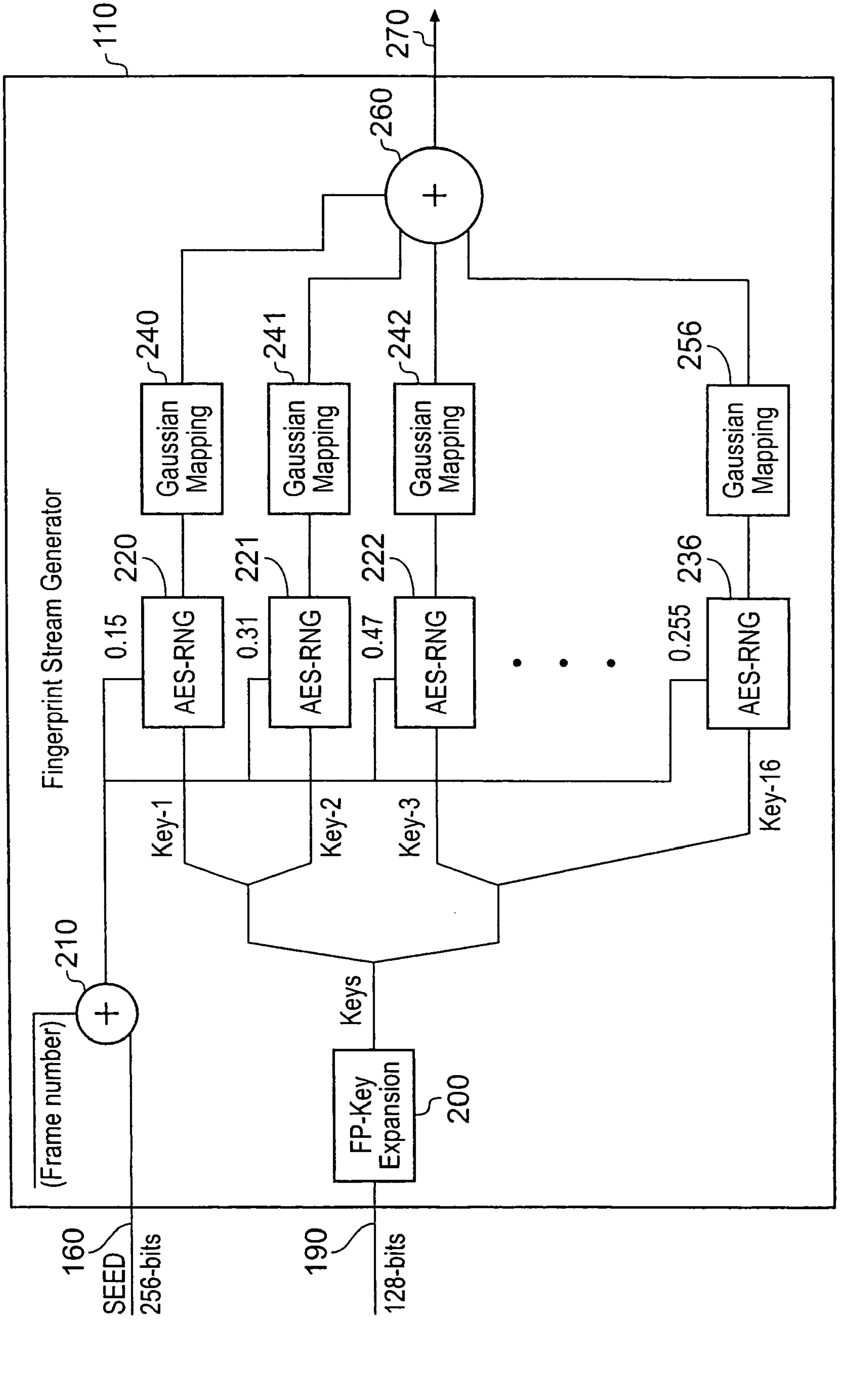
FIG. 5 schematically illustrates a fingerprint stream generator.

FIG. 5 schematically illustrates a fingerprint stream generator 110. This receives the seed data 160 from the payload generator 100 and key data 190 which is expanded by expansion logic 200 into sixteen different keys K-1 . . . K-16.

A frame number may optionally be added to the seed data 160 by an adder 210.

The stream generator has sixteen AES-Rijndael number generators 220 . . . 236. Each of these receives a respective key from the key expansion logic 200. Each is also seeded by a respective set of bits from the seed data 160. The number generator 220 is seeded by the first 16 bits of the seed data 160. The number generator 221 is seeded by the first 32 bits of the seed data 160 and so on. This arrangement allows a hierarchy of payloads to be established which can make it easier to search for a particular fingerprint at the decoding stage by first searching for all possible values of the first 16 bits, then searching for possible values of the 17th to 32nd bits (knowing the first 16 bits) and so on.

The output of each number generator 220 . . . 236 is provided to a Gaussian mapping arrangement 240 . . . 256. This takes the output of the number generator, which is effectively white noise, and applies a known mapping process to produce noise with a Gaussian profile.

The Gaussian noise signals from each instance of the mapping logic 240 . . . 256 are added by an adder 260 to generate a noise signal 270 as an output.

Figure 6:
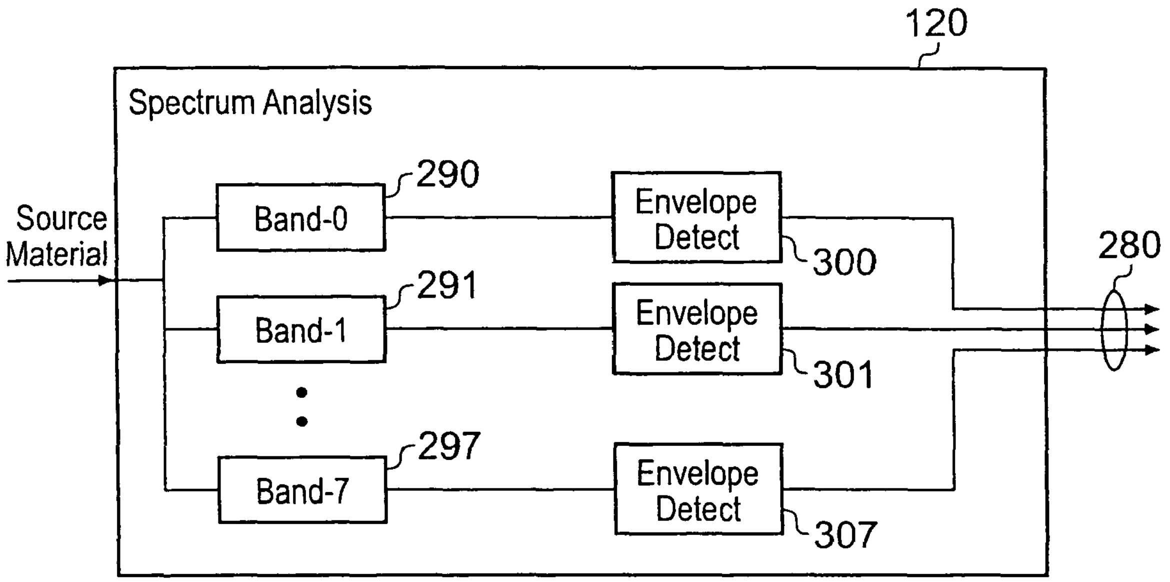
FIG. 6 schematically illustrates a spectrum analyser.

FIG. 6 schematically illustrates a spectrum analyser 120. This receives the source material (to be fingerprinted) as an input and generates envelope information 280 as outputs.

The spectrum analyser comprises a set of eight (in this example) band filters 290 . . . 297, each of which filters a respective band of frequencies from the source material. The filters may be overlapping or non-overlapping in frequency, and the extent of the entire available frequency range which is covered by the eight filters may be one hundred percent or, more usually, much less than this. The respective bands relating to the eight filters may be contiguous (i.e. adjacent to one another) or not. The number of filters (bands) used could be less than or more than eight. It will accordingly be realised that the present description is merely one example of the way in which these filters could operate.

In the present case, a mid-frequency range is handled by the filters, from about 150 Hz to about 5 kHz. This is divided into eight logarithmically equal bands, each of which therefore extends over about one octave. The filtering technique used for the band filters 290 . . . 297 is in accordance with that described above.

At the output of each band filter, is an envelope detector 300 . . . 307. This generates an envelope signal relating to the envelope of the filtered source material at the output of the respective band filter.

Figure 7:
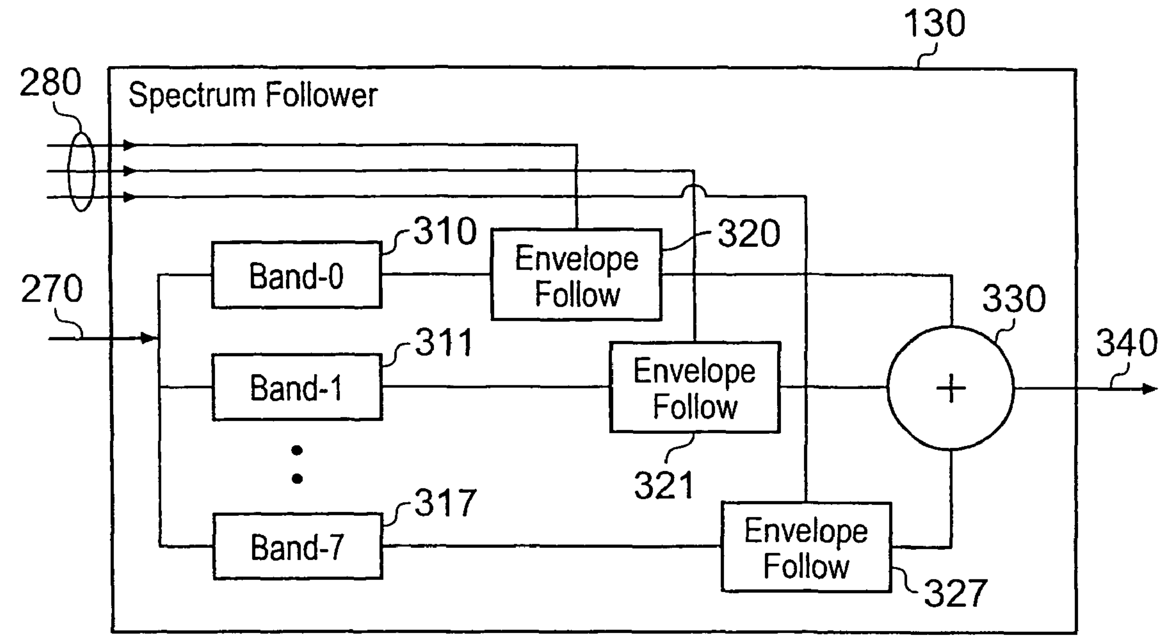
FIG. 7 schematically illustrates a spectrum follower.

FIG. 7 schematically illustrates a spectrum follower. The spectrum follower receives the envelope information 280 from the spectrum analyser 120 and the Gaussian noise signal 270 from the fingerprint stream generator 110.

The Gaussian noise signal 270 is supplied to a set of band filters 310 . . . 317. These are set up to have the same (or as near as practical) responses as the corresponding filters 290 . . . 297 of the spectrum analyser 120. This generates eight bands within the noise spectrum. Each of the filtered noise bands is supplied to a respective envelope follower 320 . . . 327. This takes the envelope signal relating to the envelope of that band in the source material and modulates the filtered noise signal in the same band. The outputs of all of the envelope followers 320 . . . 327 are summed by an adder 330 to generate a shaped noise signal 340.

The envelope followers can include a scaling arrangement so that the eventual shaped noise signal 340 is at an appropriate level with respect to the source material, for example minus 30 dB with respect to the source material.

As mentioned above, the shaped noise signal 340 is added to the source material by the adder 140 to generate fingerprinted source material as an output signal.

The fingerprinting process can take place on different audio channels (such as left and right channels) separately or in synchronism. It is however preferred that a different noise signal is used for each channel to avoid a pirate attempting to derive (and then remove or defeat) the fingerprint by comparing multiple channels. In either case, the envelope signals 280 preferably relates to the individual audio channel being fingerprint encoded.

The operation of the envelope detection and envelope following described above will now be explained in more detail with reference to FIGS. 8 to 11. Note that in the case of the spectrum follower described above, envelope following would take place in respect of each channel or band. Also, the time constants to be described below can be made dependent on the audio frequency or frequency range applicable to a band, e.g. dependent on the fastest rise time of a signal within that band. This would allow them to be adjusted as a group, by simply changing the relationship between time constant and fastest rise time.

In FIGS. 8 to 11, the horizontal axis represents time on an arbitrary scale, the solid curve represents an example (in schematic form) of an envelope signal relating to the source material and the broken lines represent (in schematic form) the modulation applied by the envelope followers 320 . . . 327.

Figure 8:
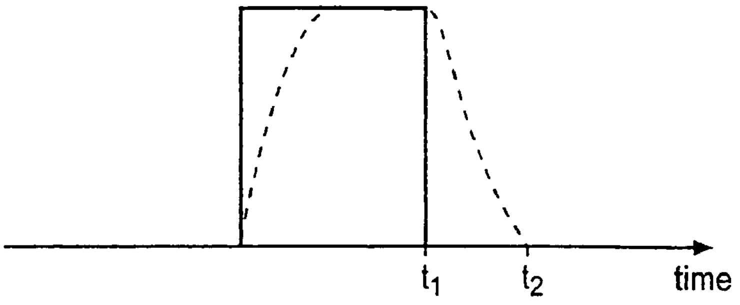
FIGS. 8 to 11 schematically illustrate the operation of an envelope follower.

In FIG. 8, a time constant is applied by the envelope follower to restrict the rise time of the noise signal in response to a sudden rise of the envelope of the source material. This is represented by a left hand section of the broken line, lagging in time behind the more vertical rise of the solid line. Such a time constant is often referred to as an "attack" time constant. However, it will be noted in all of FIGS. 8 to 11 that although the rate of rise of the noise signal is limited, the time at which the noise signal starts to rise is the same as the time at which the envelope signal starts to rise (subject only to trivial time differences caused by detection delays). It would be possible to delay (or even, with the time-advanced arrangements described below, advance) the start of the noise signal's rise with respect to the envelope signal, but this appears to give little benefit. In particular, delaying the rise of the noise signal restricts the useful payload which can be concealed behind a rising signal, and advancing the noise signal's start time could give audible artefacts similar to those to be described with reference to the trailing edge of the envelope of FIG. 8.

Similarly, at the trailing edge of the source material envelope, the decrease of the noise envelope shown by the trailing dotted line is also restricted by a "decay" time constant. Unfortunately, this means that over a period from $t_1$ to $t_2$ the noise signal is larger than the source material signal and so the noise could be subjectively disturbing to the listener.

Figure 9:
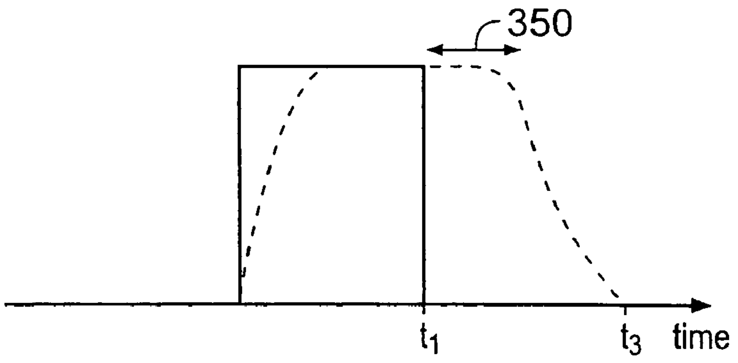

FIG. 9 illustrates the situation common in envelope following audio effects processors, whereby a "sustain" period 350 is defined which delays the onset of the decay of the envelope-following signal (in this case, the noise signal). This makes the situation described above even worse, in that the noise signal is now larger than the source material signal between times $t_1$ and $t_3$. Accordingly, a sustain period is not used in the present embodiments.

Measures to address this problem will be described with reference to FIGS. 10 and 11.

Figure 10:
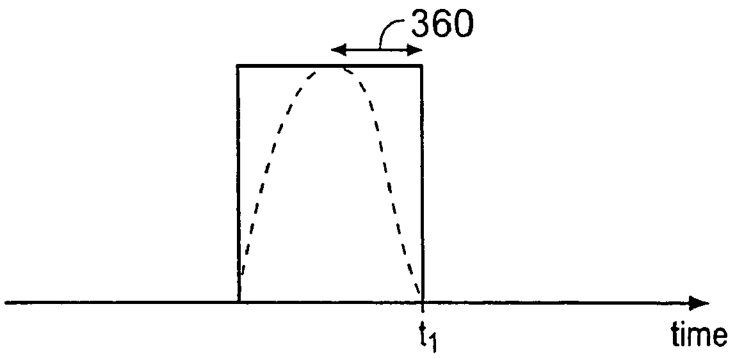

In FIG. 10, the time at which the noise signal starts to decrease is advanced with respect to the time at which the source material's envelope decreases by an advanced time 360. In this example, this means that the noise signal has decayed to insignificant levels by the time t1.

Figure 11:
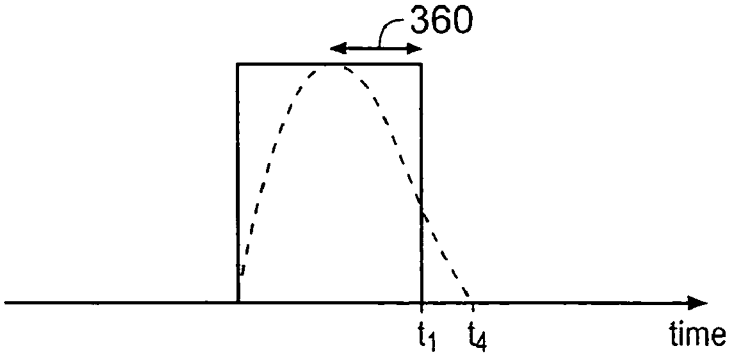

In FIG. 11, if the advance period 360 is reduced slightly, then the noise signal starts to decrease before the source material's envelope decreases, but it has not finished decreasing by the time $t_1$. This means that between the times $t_1$ and $t_4$ there is a small amount of noise still present, but the problem is much less than that shown in FIG. 8.

Accordingly, by starting the decrease of the noise signal at an earlier time than the decrease of the source material envelope which prompts that noise reduction, the subjectively disturbing excess noise shown in FIGS. 8 and 9 can be reduced or avoided.

In order to achieve this, it is necessary to include a delay somewhere within the system so that envelope information for the source material can be acquired in a time-advanced relationship to the addition of the source material to the noise at the adder 140. The delay shown in FIG. 3 is a very schematic example of how this might be achieved. The skilled person will appreciate that many other possibilities are available. In the above example, a delay is imposed in the path from the source material to combiner 140. In this arrangement, the spectrum analyser 130 can operate (in respect of each envelope signal, if more than one is derived) as follows: (a) for a rising envelope, apply a delay to the envelope signal (by a delay element, not shown) equivalent to the delay τ applied by the delay element; and (b) for a falling envelope, apply a delay to the envelope signal which is less than the delay τ.

Extraction Process

The major stages of fingerprint extraction are as follows:

1. The suspect material is treated to attempt to reverse any damage or distortion.
2. So-called proxy content (a term used to describe an unwatermarked original version of the content) is subtracted from the suspect content to leave the suspect fingerprint. This relies on being able to align temporally the suspect material and the proxy content. In some circumstances a watermarked proxy may be used. Of course the watermark in the proxy is likely to be detected by correlation, but it does not prevent other watermark(s) being detected, and can be ignored. In this way secured copies may be sent to third parties contracted to operate the extraction process.
3. The suspect fingerprint is "unshaped" according to a spectral analysis of the proxy content.
4. For each candidate payload in the population for this content, compare candidate payload to the suspect payload over a relatively short section of content. If the value SimVal looks promising, add this candidate to the short-list of candidates that will be subjected to a much longer analysis.

Figure 2:
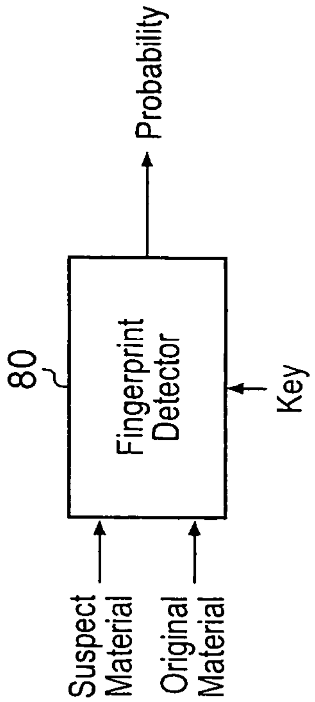
FIG. 2 schematically illustrates a fingerprint detector.
Figure 12:
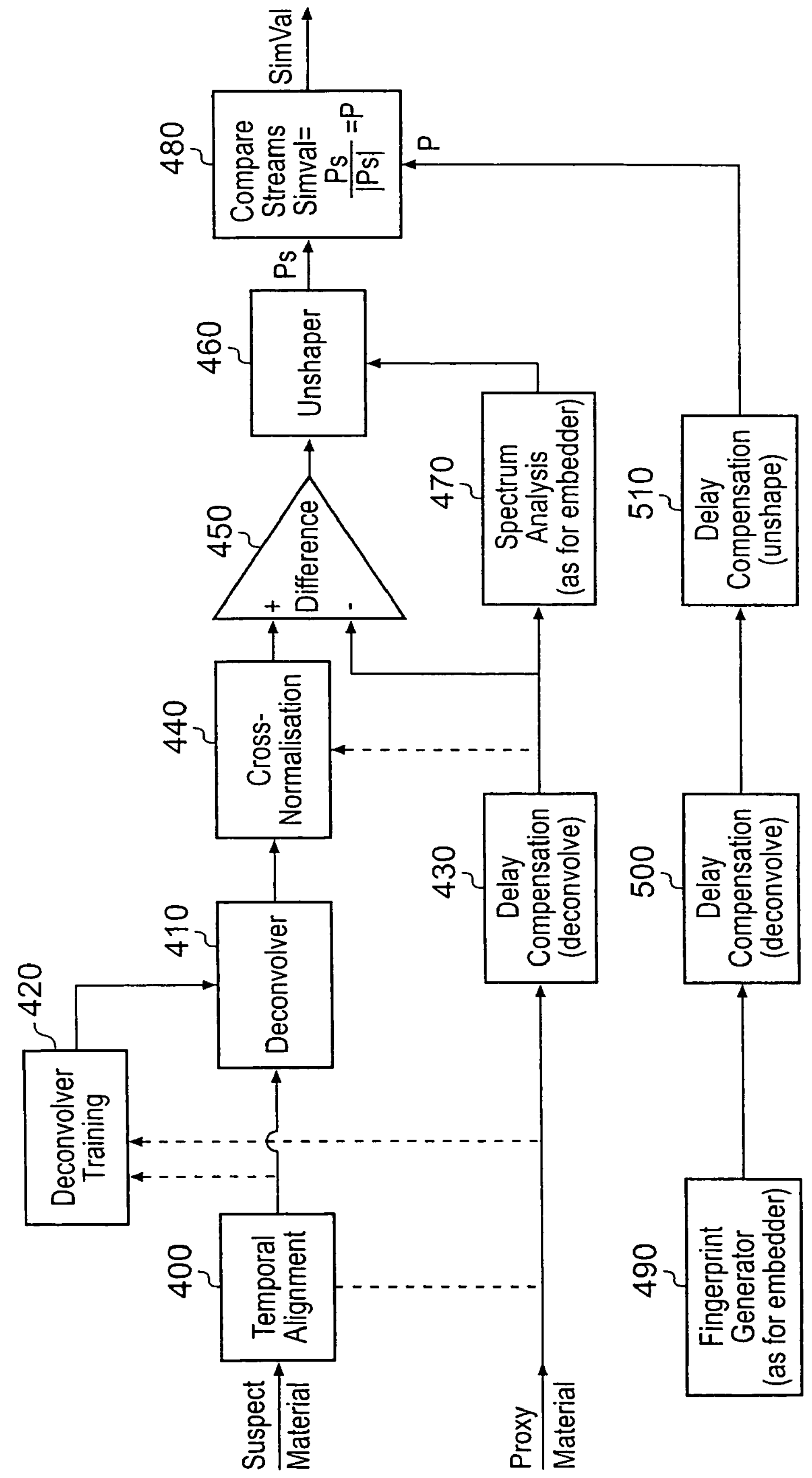
FIG. 12 is a schematic overview of the operation of a fingerprint detector.

FIG. 12 is a schematic overview of the operation of a fingerprint detector such as the detector 80 of FIG. 2. The detector receives suspect material, such as a suspected pirate copy of a piece of content, and so-called proxy material which is a plain (non-watermarked) copy of the same material.

The suspect material is first supplied to a temporal alignment unit 400. The operation of this will be described below with reference to FIGS. 13 to 18. In brief, however, the temporal alignment unit detects any temporal offset between the proxy material and the suspect material and so allows the two sets of material to be aligned temporarily. The alignment which can potentially be achieved by the temporal alignment 400 is to within a certain tolerance such as a tolerance of ±one sample. Further time corrections to allow a complete alignment between the two signals are carried out by a deconvolver 410 to be described below.

The deconvolver applies an impulse response to the suspect material to attempt to render it more like the proxy material. The aim here is to reverse (at least partially) the effects of signal degradations in the suspect material; examples of such degradations are listed below.

In order to do this, the deconvolver 410 is "trained" by a deconvolver training unit 420. The operation of the deconvolver training unit will be described below with reference to FIGS. 19 to 25, but in brief, the deconvolver training unit compares the time-aligned suspect material and proxy material in order to derive a transform response which represents what might have happened to the proxy material to turn it into the suspect material. This transform response is applied "in reverse" by the deconvolver 410. Preferably, the transform response is updated at different positions within the suspect material so as to represent the degradation present at that particular point. In the embodiment to be described below, the transform response detected by the deconvolver training unit is based upon a rolling average of responses detected over a predetermined member of most-recent portions for blocks of the suspect material and proxy material.

A delay 430 may be provided to compensate for the deconvolver and deconvolver training operation.

A cross normalisation unit 440 then acts to normalise the magnitudes of the deconvolved suspect material and the proxy material. This is shown in FIG. 12 as acting on the suspect material but it will be appreciated that the magnitude of the proxy material could be adjusted, or alternatively, the magnitudes of both could be adjusted.

After normalisation, a subtractor 450 establishes the difference between the normalised, deconvolved suspect material and the proxy material. This difference signal is passed to an "unshaper" 460 which is arranged to reverse the effects of the noise shaping carried out by the spectrum follower 130. In order to do this, the proxy material is subjected to a spectrum analysis stage 470 which operates in an identical way to the spectrum analyser 120 of FIG. 3.

So, the spectrum analyser 470 and the unshaper 460 can be considered to operate in an identical manner to the spectrum analyser 120 and the spectrum follower 130, except that a reciprocal of the envelope-controlled gain value is used with the aim of producing a generally uniform noise envelope as the output of the unshaper 460. The noise signal generated by the unshaper 460, Ps is passed to a comparator 480. The other input to the comparator, P, is generated as follows.

A fingerprint generator 490 operates in the same way as the payload generator 100 and fingerprint stream generator 110 of FIG. 3. Accordingly, these operations will not be described in detail here. The fingerprint generator 490 operates, in turn, to produce all possible variants of the fingerprint which might be present in the suspect material. Each is tested in turn to derive a respective likelihood value SimVal.

Of course it would be possible to employ multiple fingerprint generators 490 and to use multiply comparators 480 acting in parallel so that the noise stream Ps is compared with more than one fingerprint at a time.

Delays 500, 510 are provided to compensate for the processing delays applied to the suspect material, in order that the fingerprint generated by the fingerprint generator 490 is properly time-aligned with the fingerprint which may be contained within the suspect material.

It would be possible to store the output of the unshaper, so that one or more further comparisons with respective different fingerprints (as processed by the modules 490, 500, 510) could take place without having to repeat the processing leading up to the output of the unshaper.

Temporal Alignment

The first thing to do with the suspect pirated signal is to find the true synchronisation with the proxy signal.

A sub-sample delay may be included to allow, if necessary, to compensate for any sub-sample delay/advance imposed by re-sampling or MP3 encoding effects.

Figure 13:
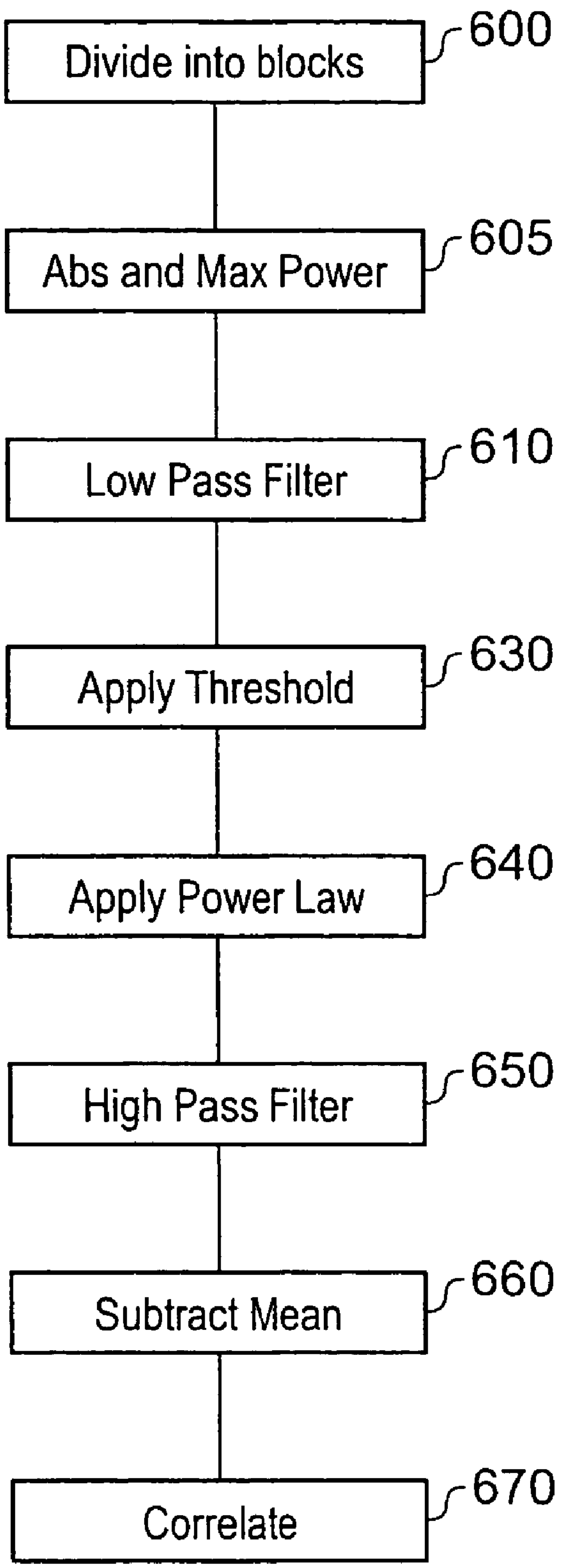
FIG. 13 is a schematic flowchart showing a part of the operation of a temporal alignment unit.

FIG. 13 is a schematic flowchart showing a part of the operation of the temporal alignment unit 400. Each step of the flowchart is implemented by a respective part or function of the temporal alignment unit 400.

While it would be possible, in theory, to align the suspect and proxy material by a (single) direct correlation process, in the case of substantial material such as a film soundtrack, the correlation processing required would be enormous, as the processing operations increase generally with the square of the number of audio samples involved. Accordingly, the present process aimed to provide at least an approximate alignment without the need for a full correlation of the two signals.

Referring to FIG. 13, at a step 600, the two audio signals are divided into portions or blocks. These blocks are of equal size for each of the two signals, but need not be a predetermined size. So, one option would be to have a fixed size of (say) 64 k samples, whereas another option is to have a fixed number of blocks so that the total length of the longer of the two pieces of material (generally the proxy material) is divided by a predetermined number of blocks to arrive at a required block size for this particular instance of the time alignment processing. In any event, the block size should be at least two samples.

A low pass pre-filtering stage (not shown) can be included before the step 600 of FIG. 13. This can reduce any artefacts caused by the arbitrary misalignment between the two signals with respect to the block size.

At a step 605, the absolute value of each signal is established and the maximum power detected (with reference to the absolute value) for each block. Of course, different power characteristics could be established instead, such as mean power. The aim is to end up with a power characteristic signal from each of the proxy and suspect signals, having a small number (e.g. 1 or 2) of values per block. The present example has one value per block.

At a step 610, the two power characteristic signals are low-pass filtered or smoothed.

Figure 14:
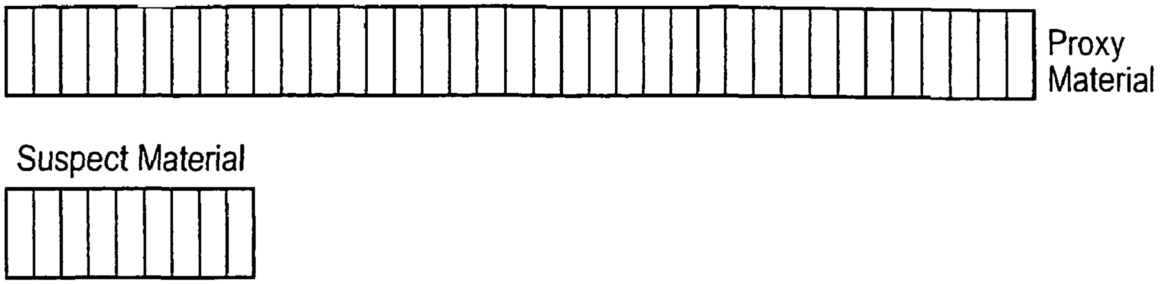
FIG. 14 schematically illustrates suspect material and proxy material divided into blocks.

FIG. 14 schematically illustrates the division of the two signals into blocks, whereby in this example the proxy material represents the full length of a movie film and the suspect material represents a section taken from that movie film.

Figure 15:
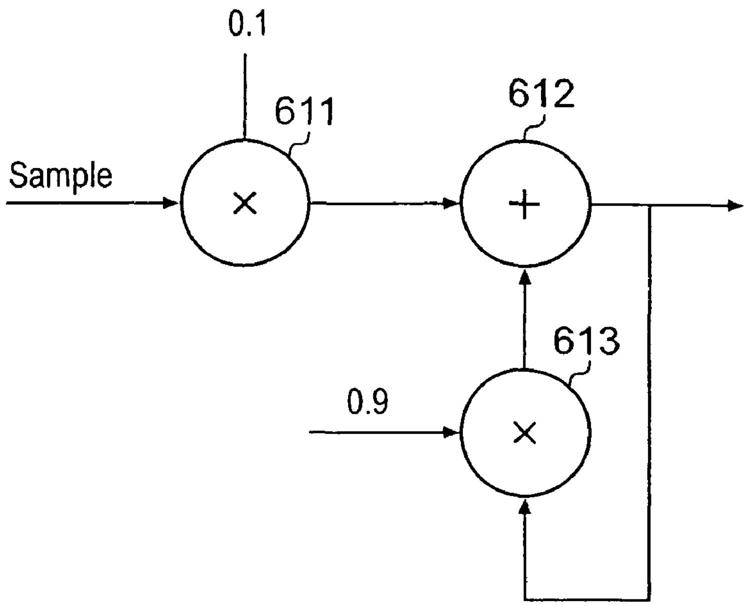
FIG. 15 schematically illustrates a low pass filter arrangement.

FIG. 15 schematically illustrates a low pass filter applied to the two power characteristic signals separately. Each sample is multiplied (at a multiplier 611 by a coefficient, and added at a adder 612 to the product of the adder's output and a second coefficient. This takes place at a multiplier 613. This process produces a low-pass filtered version of each signal.

At this stage, the two power characteristic signals have a magnitude generally between zero and one. The filtering process may have introduced some minor excursions above one, but there are no excursions below zero because of the absolute value detection in the step 605.

Figure 16:
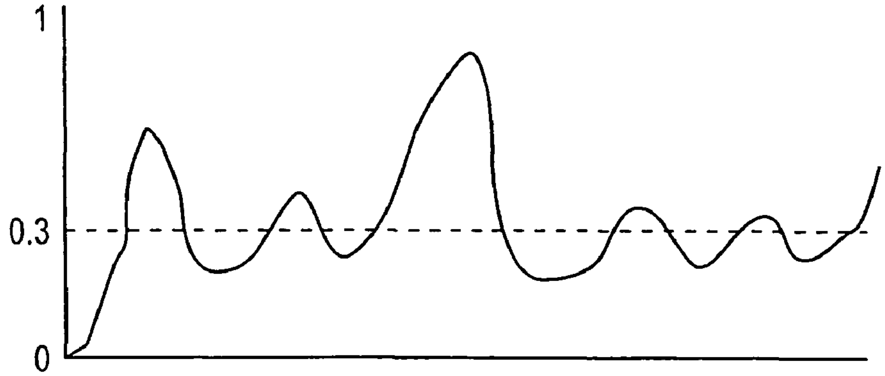
FIG. 16 schematically illustrates a thresholded signal.
Figure 17:
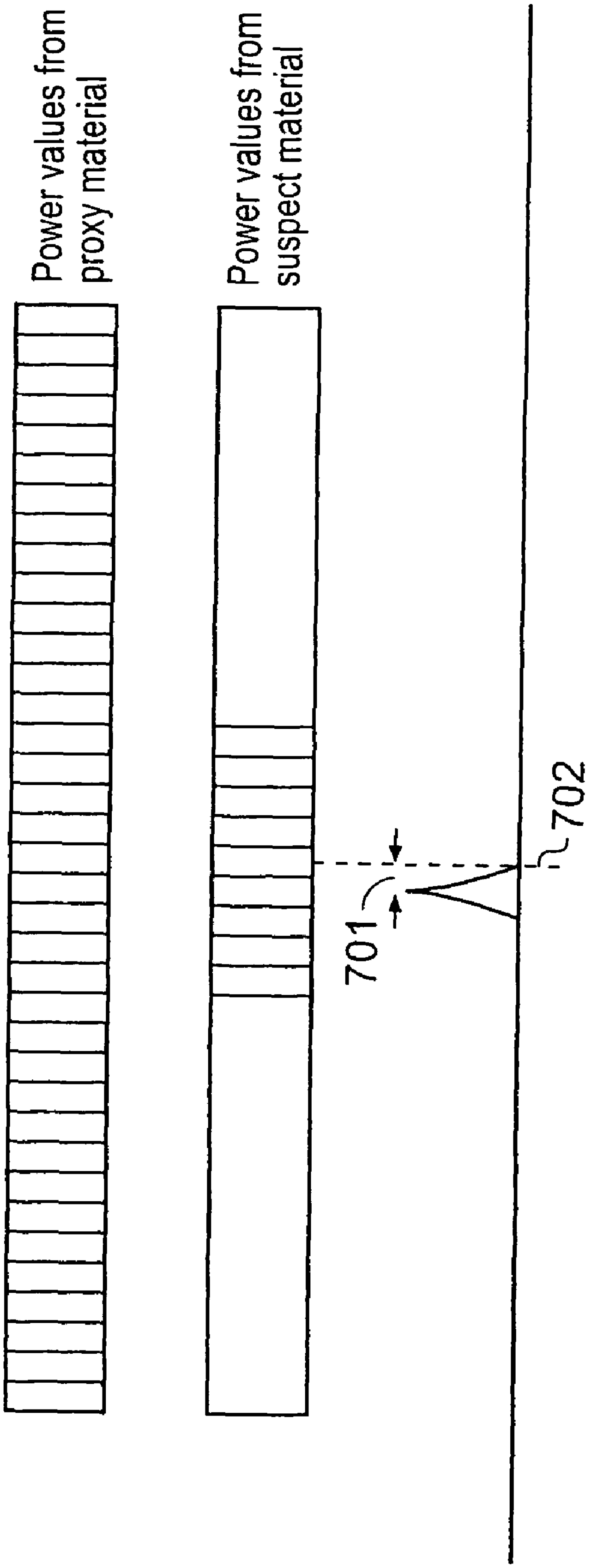
FIG. 17 schematically illustrates a correlation operation.

At a step 630, a threshold is applied. This is schematically illustrated in FIG. 16. An example of such a threshold might be 0.3, although of course various other values can be used.

The threshold is applied as follows.

The aim is to map the power characteristic signal value corresponding to the threshold to a revised value of one. Any signal values falling below the threshold will be mapped to signal values between zero and one. Any signal values falling above the threshold will be mapped to signal values greater than one. So, one straightforward way of achieving this is to multiply the entire power characteristic signal by a value of 1/threshold, which in this case would be 3.33 . . . .

The reason why this is relevant is that the next step 640 is to apply a power law to the signals. An example here is that each signal is squared, which is to say that each sample value is multiplied by itself. However, other powers greater than 1, integral or non-integral, could be used. The overall effect of the step 630 and 640 is to emphasise higher signal values and diminish the effect of lower signal values. This arises because any number between zero and one which is raised to a power greater than one (e.g. squared) gets smaller, whereas any signal value greater than one which is raised to a power greater than one becomes larger.

After application of the power law, the resulting signals are subjected to an optional high-pass filtering process at a step 650. At a step 660, the mean value of each signal is subtracted so as to generate signals having a mean of zero. (This step is useful for better operation of the following correlation step 670).

Finally, at a step 670, the power characteristic signals are subjected to a correlation process. This is illustrated schematically in FIG. 17, where the power values from the suspect material are padded with zeros to provide a data set of the same length as the proxy material. The correlation process will (hopefully) generate a peak correlation, whose offset 701 from a centre position 702 indicates a temporal offset between the two files. This offset can be corrected by applying a relative delay to either the proxy or the suspect signals.

The process described with reference to FIG. 13 to 17 can be repeated with a smaller block size and a restricted range about which correlation is performed (taking the offset 701 from the first stage as a starting position and an approximate answer). Indeed, the process can be repeated more than twice at appropriately decreasing block sizes. To gain a benefit, the block size should remain at least two samples.

Figure 18:
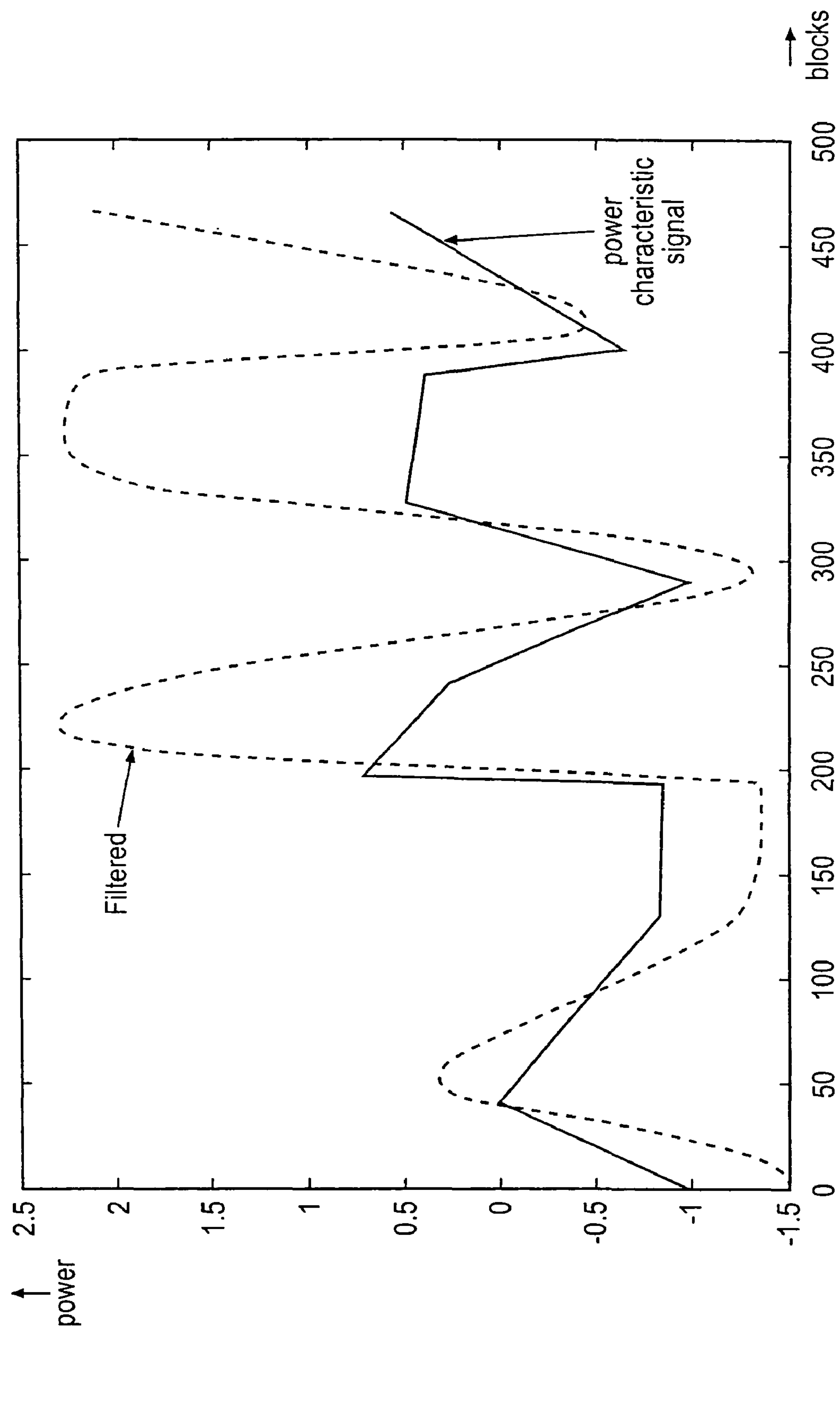
FIG. 18 schematically illustrates a power curve.

FIG. 18 schematically illustrates a power characteristic signal as generated by the step 605, and a filtered power characteristic signal as generated by the step 660. Here, the threshold is 0.3, the power factor in step 640 is 1.5 and a 1/10 scaling has been applied.

Damage Reversal

The purpose of damage reversal is to transform the pirated content in such a way that it becomes as close as possible to the original proxy version. This way the suspect payload Ps that results from subtracting the proxy from the pirated version will be as small as possible, which should normally result in larger values of SimVal.

For audio, there is a long list of possible distortions that can be accidentally or purposefully imposed by the pirate, each potentially resulting in a reduction in the SimVal value:

High, Low, Notch, Band or Parametric Filtering

Compression, Expansion, Limiting, Gating

Overdrive, clipping.

Inflation, valve-sound, and other sound enhancement effects

Re-sampling, ADC and DAC re-conversion

Freq drift, wow-and-flutter, Phase reversal, vari-speed.

MP3-family lossy encoding/decoding techniques.

Echo, Reverb, Spatialisation.

So-called de-essing, de-hissing, de-crackling.

To counter as many of these damages as possible, the fingerprint recovery arrangement includes a general purpose deconvolver, which with reference to the Proxy signal can be trained to significantly reduce/remove any effect that could be produced by the action of a convolution filter. Other previous uses of deconvolvers can be found in telecommunications (to remove the unwanted echoes imposed by a signal taking a number of different paths through a system) and in archived material restoration projects (to remove age damage, or to remove the artefacts of imperfect recording equipment).

Briefly, the deconvolver is trained by transforming the suspect pirated audio material and the proxy version into the FFT domain. The Real/Imaginary values of the desired signal (the proxy) are divided (using complex division) by the Real/Imaginary values of the actual signal (the pirated version), to gain the FFT of an impulse response kernel that will transform the actual response to the desired response. The resulting FFT is smoothed and then averaged with previous instances to derive an FFT that represents a general transform for that audio signal in the recent past. The FFT is then turned into a time domain impulse response kernel ready for application as a convolution filter (a process that involves rotating the time domain signal and applying a window-sync function to it such as a "Hamming" window to reduce aliasing effects).

A well trained deconvolver can in principle reduce by a factor of ten the effect of non-linear gain effects applied to a pirated version, for example by microphone compression circuitry. In an empirical test, it was found that the deconvolver was capable of increasing a per-block value of SimVal from 15 to 40.

Figure 19:
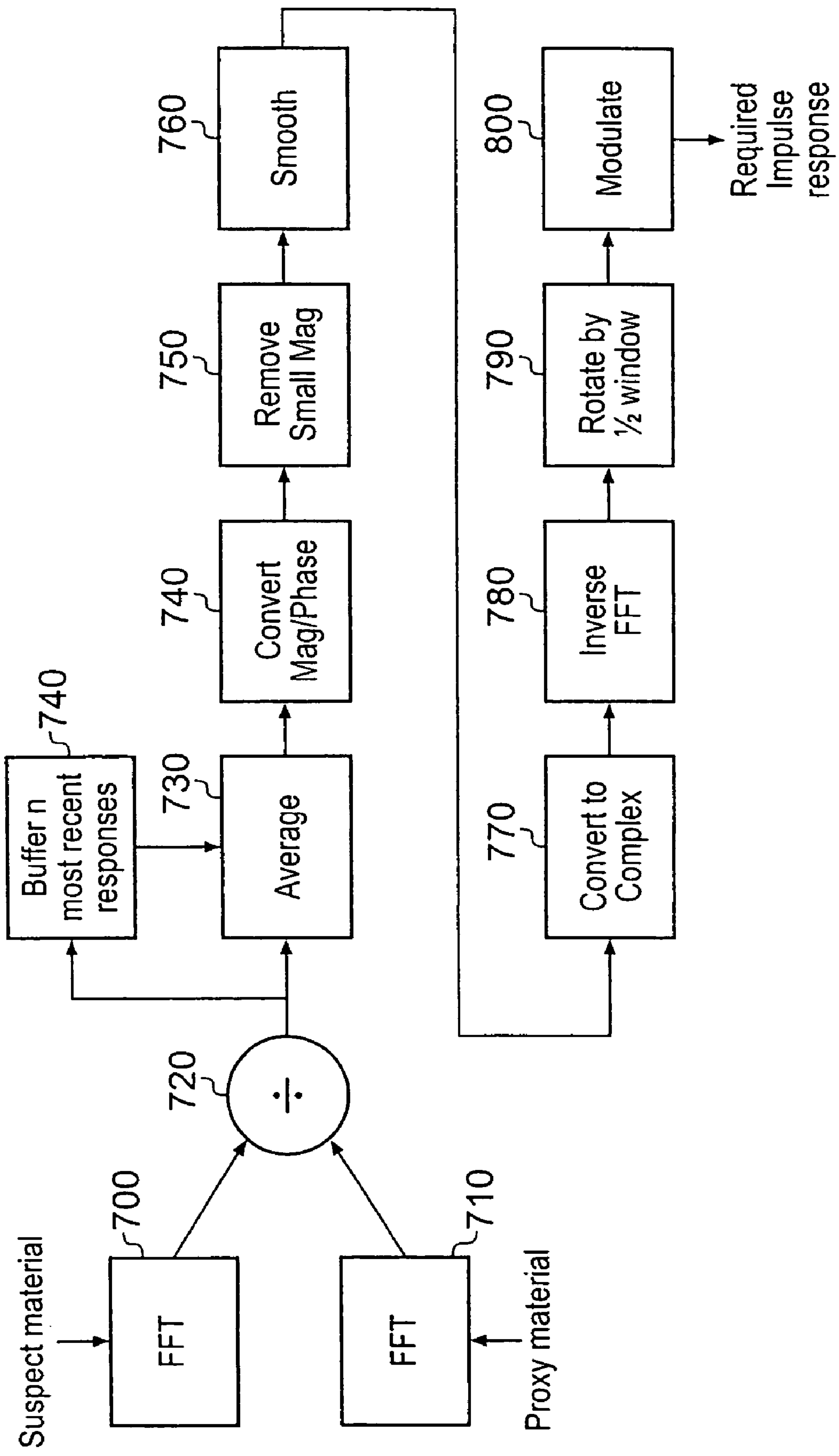
FIG. 19 schematically illustrates a deconvolver training operation.

FIG. 19 schematically illustrates a deconvolver training operation, as applied by the deconvolver training unit 420.

The process starts with a block-by-block fast Fourier transform (FFT) of both the suspect material (700) and the proxy material (710), where the block size might be, for example, 64 k consecutive samples. A divider 720 divides one of the FFTs by the other. In the present case, because it is desired to generate a transform response which will be applied to the suspect material, the divider operates to divide the proxy FFT by the suspect FFT.

An averager 730 averages a current division from the divider 720 and n most recent division results stored in a buffer 740. Of course, the most recent result is also added to the buffer and a least-recently stored result discarded. An example of n is 5. It would of course be possible to store the raw FFTs, form two averages (one for the proxy and one for the suspect material) and divide the averages, but this would increase the storage requirement.

A converter then converts the averaged division result, which is a complex result, into a magnitude and phase representation.

Logic 750 removes any small magnitude values. Here, while the magnitude value is deleted, the corresponding phase value is left untouched. The logic 750 operates only on magnitude values. The deleted small magnitude values are replaced by values interpolated from the nearest surrounding non-deleted magnitude values, by a linear interpolation.

Figure 20:
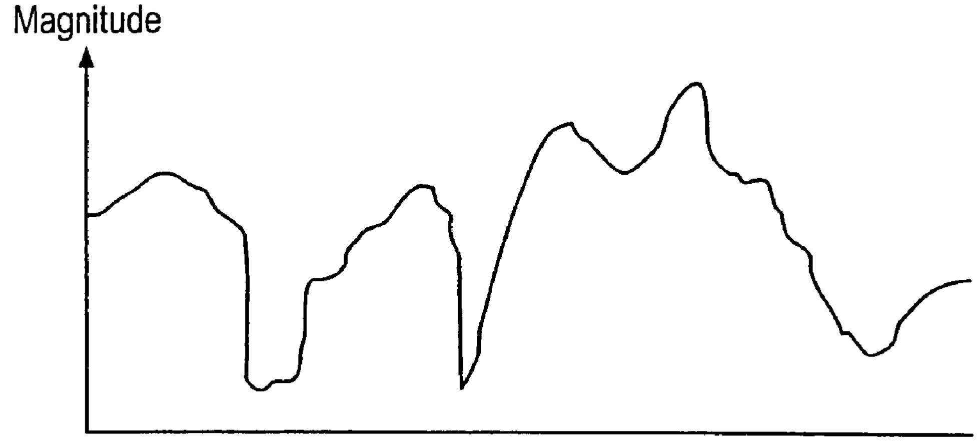
FIG. 20 schematically illustrates a magnitude curve.
Figure 21:
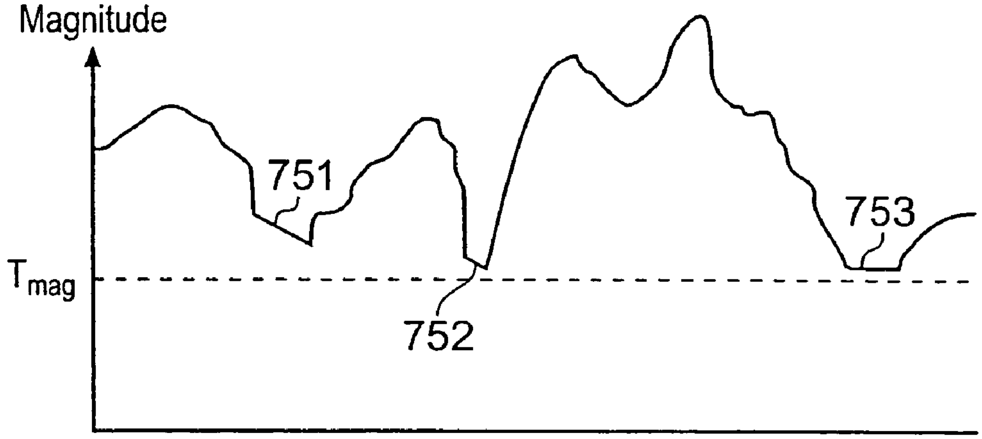
FIG. 21 schematically illustrates a thresholded and interpolated magnitude curve.
Figure 22:
FIG. 22 schematically illustrates an intermediate result of the process shown in FIG. 19.

This process is illustrated schematically in FIGS. 20 and 21, where FIG. 20 schematically illustrates the output of the magnitude/phase converter 740 as a set of magnitude values (the phase values are not shown). Any magnitude values falling below a threshold $T_{mag}$ are deleted and replacement values 751, 752, 753 generated by linear interpolation between the nearest non-deleted values.

The resulting magnitude values are smoothed by a low-pass filter 760 before being converted back to a complex representation at a converter 770. An inverse FFT 780 is then applied. This generates an impulse response rather like that shown in FIG. 22. In order to arrive at a suitable form for a deconvolution with the suspect material, the impulse response is rotated by half of the window size so as to adjoin the two half-lobes into a central peak such as that shown in FIG. 23. This is carried out by logic 790.

Figure 23:
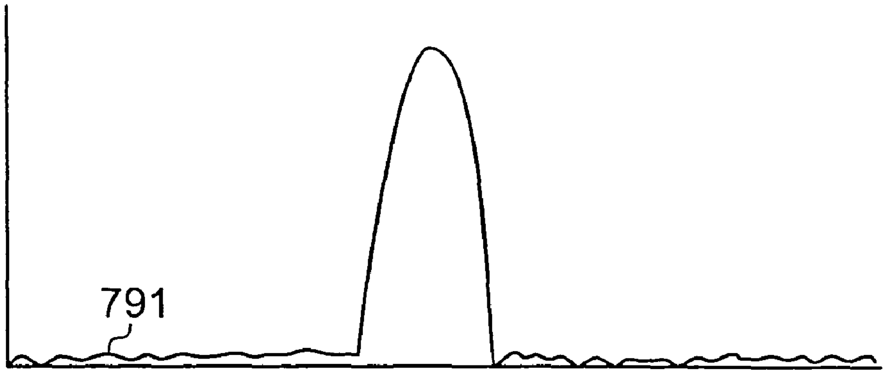
FIG. 23 schematically illustrates an impulse response.
Figure 24:
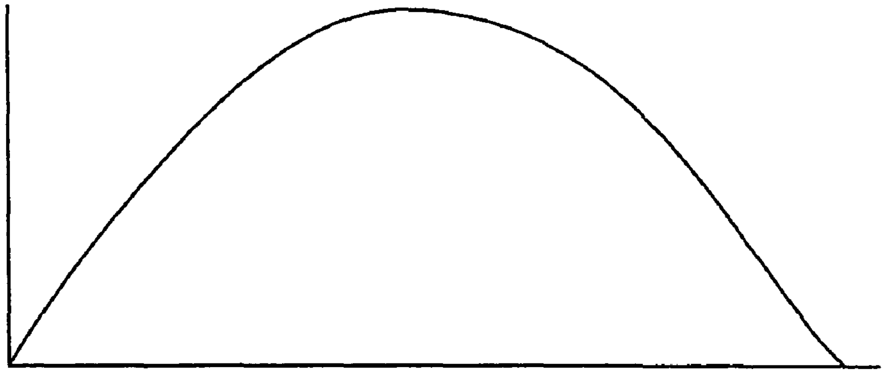
FIG. 24 schematically illustrates a smoothing curve.
Figure 25:
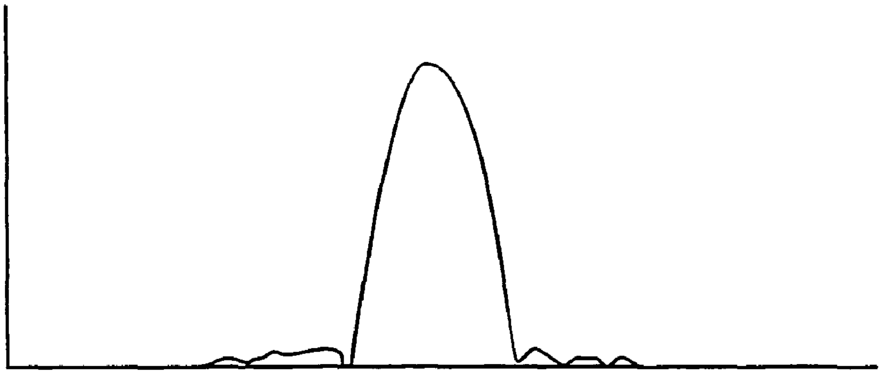
FIG. 25 schematically illustrates a smoothed impulse response.

However, the output from the logic 790, shown in FIG. 23, is still not entirely suitable for the deconvolution. This is because the side lobes 791 of this response extend across the entire window. This can cause aliasing problems if such a response was used in the deconvolver 410. Therefore, a modulator 800 multiplies the response of FIG. 23 by a sync window function such as that shown in FIG. 24, to produce a required impulse response such as that shown in FIG. 25. It is this impulse response which is supplied to the deconvolver 410.

Level Matching

After the deconvolving operation, the pirated signal is made to match the level of the proxy signal as closely as possible. In practice, empirical tests showed that a useful way to do this is to match the mean magnitudes of the two signals, rather than matching the peak values.

Once these three steps (Time alignment, Deconvolution and Level Matching) has been achieved, the proxy signal is subtracted from the pirated material to leave the suspect payload Ps.

Suspect Payload Extraction

Note that the payload signal that comes out of the Noise Shaper in the embedding process is very different from the Gaussian noise stream that went into it. In order to recover a suspect payload signal that more closely matches the candidate payload Gaussian noise stream (in the statistical sense) for purposes of finding the value SimVal, it is appropriate to reverse the effect of noise-shaping—i.e. to "unshape" the payload signal.

The "unshaping" is achieved by using the same noise-shaping component, except that instead of multiplying the gain values with the noise stream, a division is applied.

Another possible method, that of noise-shaping the candidate payload stream prior to comparison, is possible from a technical point of view but is not favoured for legal reasons. This is because it would be in violation of the mathematical principle adopted in digital rights management systems that the candidate stream be composed of statistically independent samples. The application of filters to a noise stream automatically relates the samples.

Another reason is that the technique of convolution tends to operate more successfully if the signal being sought is buried in noise. Looking for a noise stream amongst noise is generally more effective and reliable (since it yields a much more stable cross-correlation) than looking for a shaped signal amongst similarly shaped residual audio signals.

Figure 26:
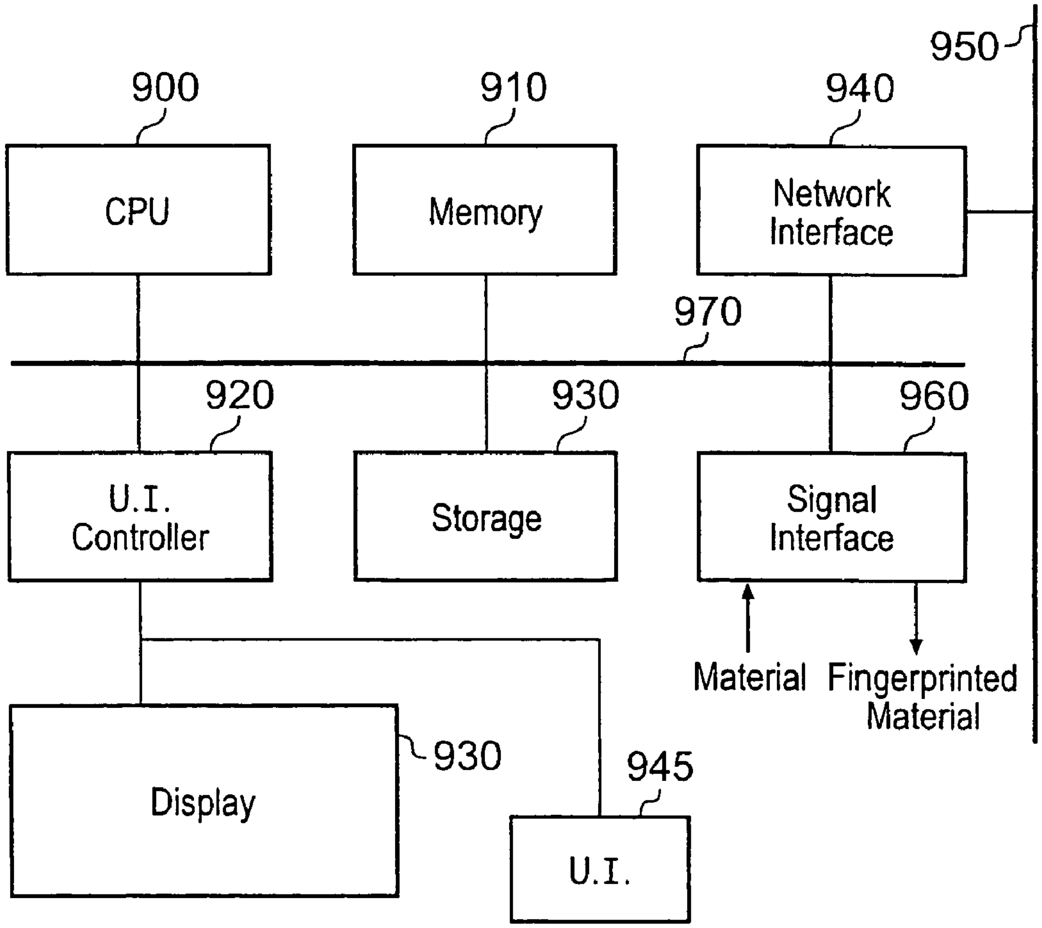
FIG. 26 schematically illustrates a data processing apparatus.

Finally, FIG. 26 illustrates a data processing apparatus. This is provided merely as one example of how the encoder 50 of FIG. 1 or the detector 80 of FIG. 2 may be implemented. However, it should be noted that at least in FIG. 1, the entire digital cinema arrangement 10 is preferably a secure unit with no external connections, so it may be that the fingerprint encoder, at least, is better implemented as a hard-wired device such as one or more field programmable gate arrays (FPGA) or application specific integrated circuits (ASIC).

Referring to FIG. 26, the data processing apparatus comprises a central processing unit 900 memory 910 (such as random access memory, read only memory, non-volatile memory or the like), a user interface controller 920 providing an interface to, for example, a display 930 and a user input device 945 such as a keyboard, a mouse or both, storage 930 such as hard disk storage, optical disk storage or both, a network interface 940 for connecting to a local area network or the internet 950 and a signal interface 960. In FIG. 26, the signal interface is shown in a manner appropriate to the fingerprint encoder 50, in that it receives unfingerprinted material and output fingerprinted material. However, the apparatus could of course be used to embody the fingerprint detector.

The elements 900, 910, 940, 920, 930, 960 are interconnected by a bus 970. In operation, a computer program is provided by a storage medium (e.g. an optical disk) or over the network or Internet connection 950 and is stored in memory 910. Successive instructions are executed by the CPU 900 to carry out the function described in relation to fingerprint encoding or detecting as described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention as defined by the appended claims.

We claim:

1. An audio processing apparatus for modifying a primary audio signal, said apparatus comprising:

a noise generator, implemented by a hardware processor, that generates a noise signal that depends on a payload signal, at least a portion of said payload signal seeding the noise generator;

a level detector that detects a signal level of said primary audio signal;

a modulator that increases or decreases a level of said noise signal, in response to an increase or a decrease of a detected signal level of said primary audio signal, to generate a modulated noise signal;

a combiner that combines said primary audio signal and said modulated noise signal; and a signal delayer, wherein said modulator operates, with respect to said signal delayer, such that a decrease in said level of said noise signal is time-advanced with respect to a corresponding decrease in said signal level of said primary audio signal.

2. The audio processing apparatus according to claim 1, in which said modulator operates, with respect to said signal delayer, such that an increase in said level of said noise signal is not time-advanced with respect to a corresponding increase in said signal level of said primary audio signal.

3. The audio processing apparatus according to claim 1, in which said payload signal is a forensic marking signal.

4. The audio processing apparatus according to claim 3, wherein the forensic marking signal includes at least one of a fingerprint and a watermark.

5. The audio processing apparatus according to claim 1, in which said noise generator is a pseudo-random noise generator seeded by all of the payload signal.

6. The audio processing apparatus according to claim 5, in which said noise generator encrypts at least the portion of said payload data in accordance with a security key.

7. The audio processing apparatus according to claim 1, in which said combiner adds said noise signal to said primary audio signal.

8. The audio processing apparatus according to claim 1, further comprising:

two or more sets, each of the sets including said level detector, said modulator and said combiner, each of the sets operating one of two or more audio frequency bands; and means for combining outputs from combiners in each of the sets.

9. The audio processing apparatus according to claim 1, further comprising a payload generator that generates said payload signal based on at least one of a serial number, a location identifier, and a location private key, wherein the location private key is used to encrypt the location identifier.

10. The audio processing apparatus according to claim 1, wherein a plurality of encryption keys further seed said noise generator.

11. The audio processing apparatus according to claim 1, wherein said noise signal is time-advanced to terminate decreasing immediately prior to or at the same time as terminating the corresponding decrease in said signal level of said primary audio signal.

12. The audio processing apparatus according to claim 1, wherein said noise signal is time-advanced to terminate decreasing immediately after terminating the corresponding decrease in said signal level of said primary audio signal.

13. An audio processing method for modifying a primary audio signal, said method comprising the steps of:

generating a noise signal that depends on a payload signal, at least a portion of said payload signal seeding generation of said noise signal;

detecting a signal level of said primary audio signal;

increasing or decreasing a level of said noise signal, in response to an increase or a decrease of a detected signal level of said primary audio signal, to generate a modulated noise signal;

combining said primary audio signal and said modulated noise signal; and time-advancing a decrease in said level of said noise signal with respect to a corresponding decrease in said signal level of said primary audio signal.

14. A non-transitory computer readable storage medium having computer readable program codes embodied in the computer readable storage medium for modifying a primary audio signal, the computer readable program codes, when executed, cause a computer to execute:

generating a noise signal that depends on a payload signal, at least a portion of said payload signal seeding generation of said noise signal;

detecting a signal level of said primary audio signal;

increasing or decreasing a level of said noise signal, in response to an increase or a decrease of a detected signal level of said primary audio signal, to generate a modulated noise signal;

combining said primary audio signal and said modulated noise signal; and time-advancing a decrease in said level of said noise signal with respect to a corresponding decrease in said signal level of said primary audio signal.

* * * * *